United States Patent Office 2,939,365
Patented June 7, 1960

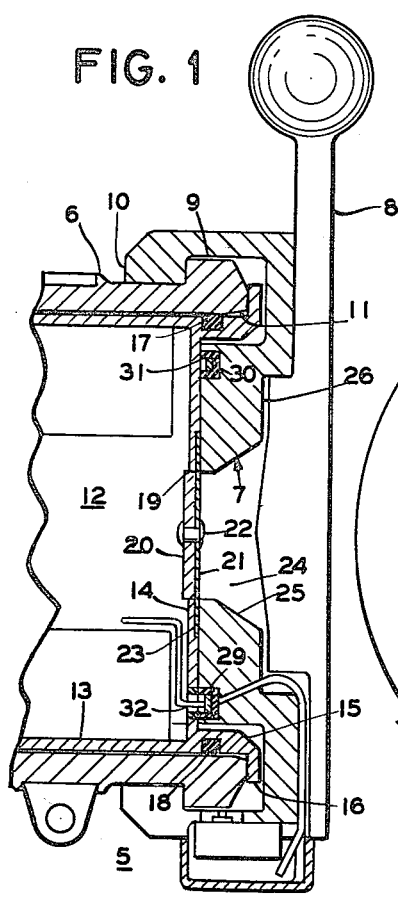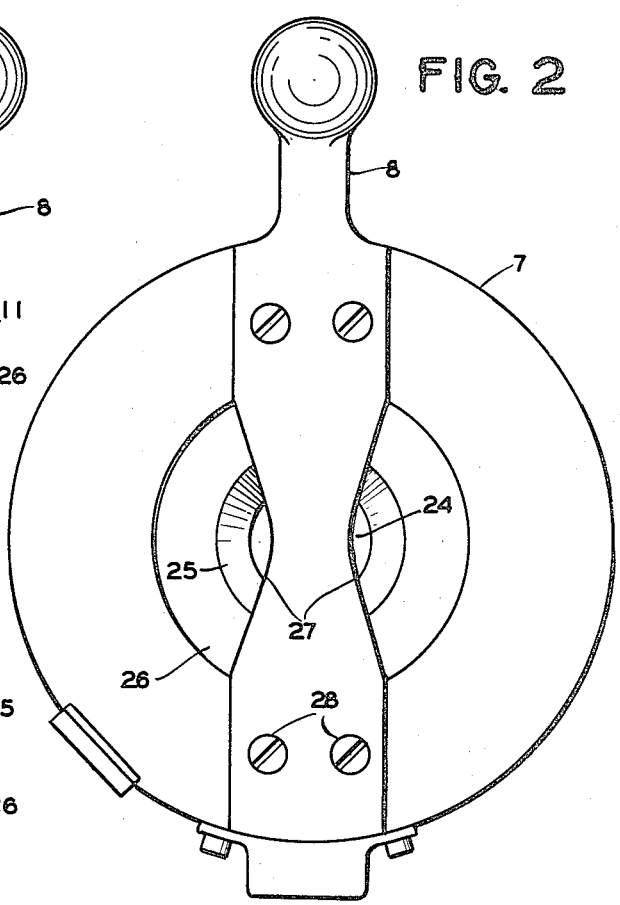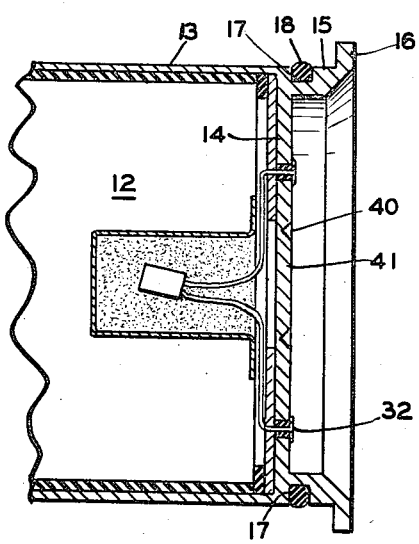
INVENTOR.
JOHN C. VAIDEN

2,939,365

SOLID PROPELLANT ENGINE STARTER APPARATUS

John C. Vaiden, Packanack Lake, N.J., assignor to Bendix Aviation Corporation, Teterboro, N.J., a corporation of Delaware Filed May 29, 1952, Ser. No. 290,717

5 Claims. (Cl. 89—1)

The present invention relates to pressure generating systems and more particularly to overpressure relief means for such systems.

In the use of solid propellant cartridges for pressure generating systems, such, for example, as the motive power for a turbine starter, it is necessary to provide overpressure relief means in the high pressure, high temperature passages to preclude dangerously high pressures in the event of faulty propellant grains or blocked gas passages.

One method for providing for the relief of excessive pressures which has been used in the past is the spring loaded relief valve. However, due to the pressures involved, the structure is cumbersome and heavy and is not practical for use in airborne equipment such as a turbine starter. Weight and space limitations will not permit the use of such a structure.

Another method heretofore used has been a permanent type of safety disc which is replaced only in the event of rupture. Permanent discs have the disadvantage in that they must be made of critical material suitable for resisting the corrosive effects of the atmosphere, of the gases to which they are exposed, and of the products of combustion. Also, the disc must have high fatigue strength as it is subject to repeated cycles of high and low pressures which cause repeated stretching of the disc. Another objection is that the disc must be mounted in a chamber which interconnects with the gas passage. Due to the high pressures normally encountered, the chamber must have substantially thick walls of corrosion resistive material. This makes the weight of the installation objectional for aircraft use. Further, the discs are difficult to replace in the event of a rupture.

The present invention overcomes the aforementioned and other disadvantages by providing an expendable disc located in the end of the cartridge so that the disc is discarded with the spent cartridge shell. The breech block is provided with a passage for the discharge of the gases should the pressure exceed the design value.

It is an object of the invention to provide novel pressure relief means for a pressure generating system.

Another object of the invention is to provide novel expendable means for pressure relief in a pressure generating system.

Another object of the invention is to provide a novel cartridge for solid propellant charges.

Another object of the invention is to provide a novel breech structure for a solid propellant cartridge.

The above and other objects and features of the invention will appear more fully hereinafter from a consideration of the following description taken in connection with the accompanying drawing wherein two embodiments of the invention are illustrated by way of example.

In the drawing:

Figure 1 is a cross sectional view of a portion of a cartridge and breech embodying the invention.

Figure 2 is an end view of the breech of Figure 1.

Figure 3 is a cross section of a portion of a cartridge illustrating another embodiment of the invention.

Referring now to Figures 1 and 2 of the drawing, a breech is indicated generally by the numeral 5 and has a cartridge chamber 6, a breech block 7 and operating lever 8.

The cartridge chamber 6 has external lugs 9 adapted to mate with internal lugs 10 of breech block 7 to retain the breech block 7 in a closed position. The inner bore of the chamber 6 has a tapered portion 11 at the entrance thereof to facilitate the insertion of a cartridge 12.

The cartridge 12 has a cylindrical portion 13 with an end cap 14. The cap 14 has a flange portion 15 extending therefrom and having a radially outward extending flange 16 adapted to coact with the lugs 9 to limit the travel of the cartridge 12 into the chamber 6. The flanged portion 15 has a circumferential groove 17 around the outer perimeter thereof adapted to receive a compressible sealing ring 18.

The end cap 14 has an opening 19 adapted to receive a plug 20. The plug 20 may be secured in the opening 19 by a press fit, cementing, or in any other conventional manner. The plug 20 has a disc 21 secured thereto by a rivet 22. The disc 21 extends beyond the plug 20 and is adapted to fit into a counterbore portion 23 of the end cap 14.

The breech block 7 has an opening 24 adapted to coincide with the opening 19 in the end cap 14 when the block 7 is in the closed position. The opening 24 has an outwardly flared portion 25 terminating in a counterbore portion 26 of the breech block 7.

The operating lever 8 has a necked portion 27 that coincides with the openings 19 and 24 to provide a passage for gases on either side thereof. The lever 8 is secured to the breech block 7 by screws 28 or in any other conventional manner.

The breech block 7 has a groove 29 adapted to receive an insulating ring 30. The ring 30 has a contact ring 31 embedded therein which is adapted to engage a contact member 32 extending through and insulated from the end cap 14 of the cartridge 12 thus providing an electric circuit for firing the cartridge 12.

In operation, a cartridge is inserted into the chamber 6 and the breech block closed and locked. The breech block 7 supports the disc 21 enabling it to withstand normal pressures. Should the pressure exceed a predetermine value, the disc 21 will rupture permitting the plug 20 to be blown out and the gases to escape through the opening 24. The necked portion 27 of the handle 8 will prevent the plug 20 from flying out yet permits the escape of the gases.

The sudden release of pressure caused by the plug 20 blowing out usually causes the propellant charge to be extinguished so that all action ceases immediately. However, in the event that it continues to burn no damage is done since it burns out at the low pressure.

With the aforenoted construction, the disc is replaced with each cartridge so that it is not subject to fatigue stresses nor to corrosive atmosphere. Thus, an inexpensive, simple disc can be used.

Referring now to Figure 3 in which a different embodiment of the blowout disc is illustrated, the same reference numerals have been assigned for similar parts as in Figures 1 and 2 and only that portion differing from Figure 1 will be described in detail.

The end cap 14 of the cartridge 12 has a V-shaped groove 40 defining a plug portion 41. While the groove 40 has been shown in the outer surface of the end cap 14, it is understood that it could be in the inner surface or in both surfaces. The plug portion 41 is adapted to coincide with the opening 24 in the breech block 7 in the same manner as the plug 20 in Figure 1.

In operation, the section 41 will rupture at the V-groove upon the pressure exceeding a predetermined value thus releasing the gases. Upon replacement of the cartridge, the pressure release means are provided by the simple machined groove in the casing of the cartridge.

One of the main advantages of the pressure relief means of the invention is that the pressure release discs are replaced merely by inserting a new cartridge into the breech chamber. Further, it is light in weight and economical to manufacture.

Although only two embodiments of the invention have been illustrated and described, various changes in the form and relative arrangement of the parts, which will now appear to those skilled in the art, may be made without departing from the scope of the invention.

What is claimed is:

1. A gas generating device comprised of a breech having a cylindrical cartridge chamber with a rear circular opening, a cylindrical cartridge containing a gas generating substance in said chamber, said cartridge having an end wall and being positioned so that end wall is adjacent said rear circular opening of said breech, said cartridge having a small circular safety plug in the center of its end wall, said safety plug being metallic and constructed to rupture at a pressure higher than normally desired within said breech, said safety plug having a diameter appreciably smaller than the diameter of said cartridge, means including a circular breech block locking said cartridge in said breech and positioning said end wall of said cartridge adjacent said circular opening of said breech, said breech block terminating longitudinally adjacent said breech opening and having a diameter substantially the same as said cartridge, said breech block having an axial gas-escape hole therethrough, said gas-escape hole being so constructed as to readily permit the escape of gas when said safety plug ruptures, said breech block also including an operating lever extending along a diameter of said circular breech block, said lever having a necked central portion, said necked central portion having an axially-centered, small-dimensioned section which is appreciably less in width than said axial gas-escape hole in said breech block.

2. The device according to claim 1 wherein said safety plug is constructed to rupture at its periphery, said axial gas-escape hole in said breech block has a diameter about equal to the diameter of said safety plug and flares outwardly as a conical annulus, and said necked central portion of said operating lever has a width, outwardly of said small-dimensioned section and adjacent the outer part of said conical annulus, which is about equal to the diameter of said plug.

3. The device according to claim 2 wherein said safety plug is positioned in a central hole in the end wall of said cartridge and is comprised of a thick circular plug and a thin rupturable disc, said rupturable disc having a larger diameter than said circular plug, said thin disc is received in an annular recess about the central hole in the end of said cartridge and is clamped between said cartridge end wall and the adjacent annulus of said breech block.

4. The device according to claim 2 wherein said circular safety plug comprises the part of the end wall of said cartridge which is inwardly of a circular groove formed in the central outer face of the end wall of said cartridge.

5. A high-pressure gas generator for an aircraft turbine starter comprised of a chamber having a circular breech in one end thereof, said breech terminating in annular part having outwardly-extending lugs and a circular breech opening, a gas-generating, cylindrical cartridge in said breech and being in gas-tight relationship with the inner wall of said breech, said cartridge having a circular end wall which positioned inwardly of said circular breech opening, a short annular breech block having a central opening bearing against the end wall of said cartridge and having means cooperating with said lugs to position said cartridge end wall inwardly of said circular breech opening, said breech block means also cooperating with said lugs so as to lock said cartridge in said breech, a small circular safety plug in the center part of the end wall of said cartridge adapted to rupture only when the gas pressure generated in said chamber exceeds a predetermined normal working pressure, said safety plug being so constructed as to rupture at a circular periphery, the inner part of said central opening in said breech block coinciding with said circular periphery, the outer part of said central opening being appreciably larger than said safety plug, and means extending across the enlarged outer part of said breech block central opening adapted to retain said safety plug inwardly thereof and further adapted to permit the safe escape of gas when said safety plug is ruptured and high pressure gas escapes.

References Cited in the file of this patent

UNITED STATES PATENTS

| | | |
|---|---|---|
| 2,466,714 | Kroeger et al. | Apr. 12, 1949 |
| 2,492,279 | Fowler | Dec. 27, 1949 |
| 2,537,062 | Kroeger et al. | Jan. 9, 1951 |
| 2,670,596 | Whitworth | Mar. 2, 1954 |

FOREIGN PATENTS

| | | |
|---|---|---|
| 233,347 | Great Britain | Mar. 11, 1926 |
| 264,009 | Switzerland | Dec. 16, 1949 |